United States Patent [19]

Hotaling

[11] Patent Number: 5,404,007
[45] Date of Patent: Apr. 4, 1995

[54] RADIATION RESISTANT RLG DETECTOR SYSTEMS

[75] Inventor: Steven P. Hotaling, Liverpool, N.Y.

[73] Assignee: The United States of America as represented by the Secretary of the Air Force, Washington, D.C.

[21] Appl. No.: 890,986

[22] Filed: May 29, 1992

[51] Int. Cl.⁶ .............................................. H01J 3/14
[52] U.S. Cl. ................................. 250/216; 356/350
[58] Field of Search ............... 250/211 J, 227.24, 216; 357/30 K, 2; 385/36; 257/432, 433, 434, 53; 356/350

[56] References Cited

U.S. PATENT DOCUMENTS

| | | | |
|---|---|---|---|
| 4,166,919 | 9/1979 | Carlson | 136/89 CL |
| 4,233,506 | 11/1980 | Yamamoto et al. | 250/551 |
| 4,330,182 | 5/1982 | Coleman | 352/2 |
| 4,415,760 | 11/1983 | Madan | 136/258 |
| 4,735,917 | 4/1988 | Flatley et al. | 437/59 |
| 4,741,964 | 5/1988 | Haller | 428/446 |
| 4,877,311 | 10/1989 | Shernoff | 356/350 |
| 5,075,244 | 12/1991 | Sakai et al. | 437/41 |

*Primary Examiner*—David C. Nelms
*Attorney, Agent, or Firm*—Donald J. Singer; Thomas C. Stover

[57] ABSTRACT

A ring laser gyro, RLG, is a highly accurate optical rotation sensor using counter propagating light beams to sense rotation as a rate integrating gyro. There is however, the problem of RLG blindness or loss of output data during high energy radiation, which frequently incapacitates the data-sending abilities of conventional photodetectors, mounted on RLG output prisms. This temporary RLG blindness during the high energy pulse is followed by a more permanent performance degradation, including photo darkening of the conventional RLG photodiodes which typically contain crystalline silicon or other crystalline components, which are degraded by high energy radiation, as noted above. The present invention is believed to solve this problem by providing photodetectors of amorphous material, e.g. a-Si:H PIN diode structures, which are vapor deposited onto the face of an RLG output prism. Such amorphous photodetectors are smaller than their prior art counterparts and thus absorb less radiation during a high energy event and are more radiation resistant and thus continue to provide a reliable stream of data after such high energy event which can include orientation and navigation guidance for a spacecraft, e.g. a satellite. The invention further provides for pre-irradiation of the amorphous photodetectors of the invention for improved radiation resistance and output of data during and after a high energy radiation pulse.

6 Claims, 3 Drawing Sheets

RADIATION RESISTANT RLG DETECTOR SYSTEMS

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a radiation resistant ring laser gyro (RLG), particularly an RLG which will continue to operate when exposed to high energy radiation.

2. The Prior Art

RLGs are known in the prior art and are employed, e.g., for measuring rotation in inertial space about the input axis. By way of further background, an RLG is a highly accurate optical rotation sensor using counter propagating light beams to sense rotation as a rate integrating gyro. When combined with 3 accelerometers, a three axis RLG yields an inertial sensor assembly which may be directly applied to navigation, guidance and control systems for vehicles, including satellites and other space vehicles.

An example of the above prior art systems and photo detector is shown in FIGS. 1 and 2 hereof and further discussed below.

A problem with such RLG (opto-electronics) systems is that they can be put out of commission partly or wholly, by a high energy event including a nuclear event. That is, prior art RLG systems suffer blindness or loss of output data during and after exposure to high energy radiation.

Attempts have been made to harden the RLG systems including, the use of shielding, synthetic sapphire optical elements and special high cost radiation-hard, crystalline photodiodes have been fixed to the RLG output prism using epoxy. There are few variants of these methods and the RLG today is still "blinded" or charge saturated during a high energy event. This causes data loss which deleteriously impacts a tactical and strategic mission effectiveness of vehicles including space vehicles, weapons and delivery vehicles therefor incorporating the RLG into inertial navigation systems. Such RLG blindenss today remains a problem of serious magnitude.

The shortcomings of the prior art RLGS are ostensibly concentrated in the areas of volumetric factors and charge-transport physics of the photoconductors used to detect RLG fringe patterns. The volumetric factor is that the smaller the volume of the optoelectronics in a high energy environment, the lower the radiation sensitivity of the device under consideration. The photodiodes glued to the output face of the prism, constitute a relatively large volume device as do their associated cathode and anode leads. The photodiode employed is generally crystalline in nature and as such, saturates quickly in a high energy radiation event, due to the high injected charge density and excellent carrier mobility of its crystalline materials. This saturation effect causes data loss since the injected charge fills the transport channel (of such photodiode) with large quantities of electron-hole pairs and the fringes of the RLG (Sagnac interferometer) are not detected during the event.

The above initial output data loss or RLG blindness is known as the "prompt effect" to prior art RLG photodiodes during a high energy radiation (including nuclear) event. That is, during such high energy pulsed event, there is a charge build-up in the RLG detector material, which quickly saturates or whites out and most output data collected during such event is lost. Again, the larger the volume of a detector device, the greater such "prompt effect" in disabling same.

There is also a more durable after-effect to such prior art RLG detector devices after the pulse high energy radiation has passed, that impairs the subsequent operation thereof known as the "delayed effect, including a photodarkening of such photodiodes or other prior art detector devices. That is, the burst of high energy particles can impart enough energy to the lattice of the detector material to cause atomic displacement thereof, which can result in photo darkening the material or color center creation therein, which can cause electronic defects in the detector material transport channel. Such photo darkening effect means a carrier (data) that is generated by an RLG output prism, will be stopped or trapped in the transport channel of the detector and will not be transmitted to the rest of the data collection circuit or will be transmitted in a distorted manner. The more the photo darkening effect in such detector, the more radiation-induced defects therein, the poorer will the RLG detector perform (e.g., in a navigation system) well after the high energy pulse radiation has passed.

Accordingly, there is a need and market for an RLG system, including a photodetector that significantly overcomes the above prior art shortcomings.

There has now been discovered an RLG system, including one or more RLG detectors, that address and overcome 1) the above "prompt effect" during a high energy pulsed event and 2) the above "delayed effect", so as to continue with data output during and after such high energy event. Further, such RLG output detectors of the present invention can be manufactured at greatly reduced cost over the lesser performing detectors of the prior art.

SUMMARY OF THE INVENTION

Broadly the present invention provides an integrated optical RLG output prism that is radiation resistant comprising, amorphous semiconductor diode structures mounted to the face of an RLG heterodyning prism.

The above amorphous semiconductor diode structures can be made of various amorphous material including hydrogenated amorphous silicon (a-Si:H); hydrogenated amorphous germanium (a-Ge:H) and a combination thereof (a-Ge$_x$Si$_{1-x}$:H), where x is between 0 and 1.

In a preferred embodiment, such amorphous semiconductor diode structures are pre-irradiated for increased durability and continued operation during high energy radiation events as further discussed below.

BRIEF DESCRIPTION OF THE DRAWINGS

The invention will become more apparent from the following detailed, specification and drawings in which.

DESCRIPTION OF PREFERRED EMBODIMENTS

Figure 1:
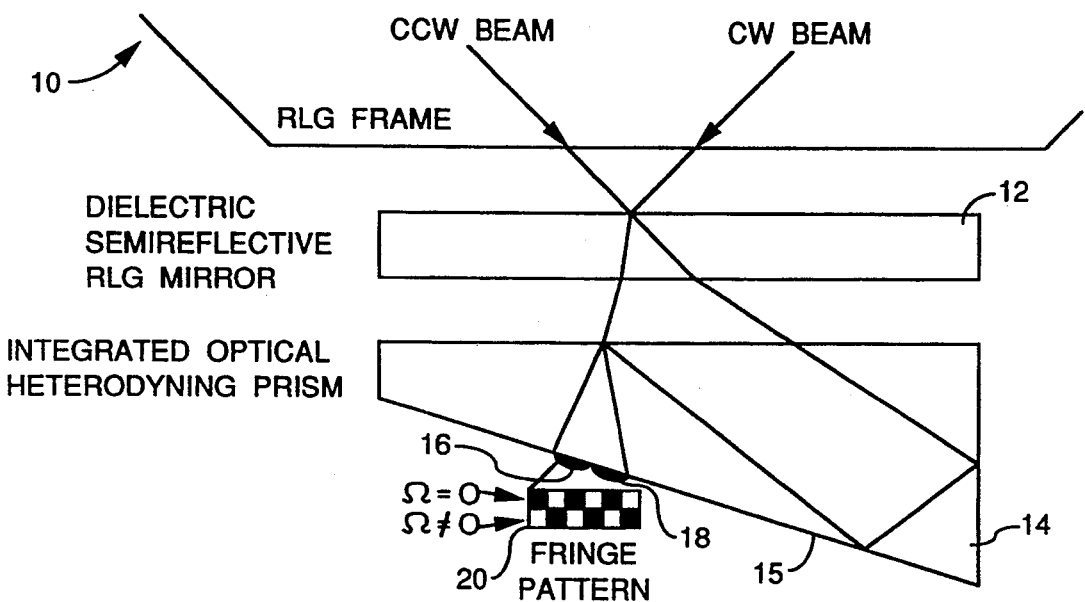
FIG. 1 is a schematic elevation exploded view of an RLG output prism and other components in a mounting arrangement used before and after the present invention.

Referring in more detail to the drawings the integrated optical heterodyning prism geometry is shown in its intended implementation, as an exploded view per FIG. 1, wherein RLG frame 10 is surmounted by RLG "output" mirror 12, in turn surmounted by integrated optical heterodyning prism 14 with a pair of photodiodes 16 and 18 mounted on the output face 15 of such prism, as shown in FIG. 1. The counter propagating photon beams CW and CCW (representing clockwise and counterclockwise beams respectively) traverse the interferometer cavity (in the RLG frame, not shown) to be heterodyned and then detected at the integrated optical heterodyning prism 14, after partial transmission through the "output" dielectric mirror 12, as indicated in FIG. 1. Such CW and CCW beams are projected through the prism 14 by the photodetectors 16 and 18, as a fringe pattern by which turning measurements of a housing (supporting such RLG frame 10) on its axis, can be taken.

As such RLG and components are prior art except for the photodetectors 16 and 18 mounted thereon, the operation of such RLG will not be further discussed herein.

Figure 2:
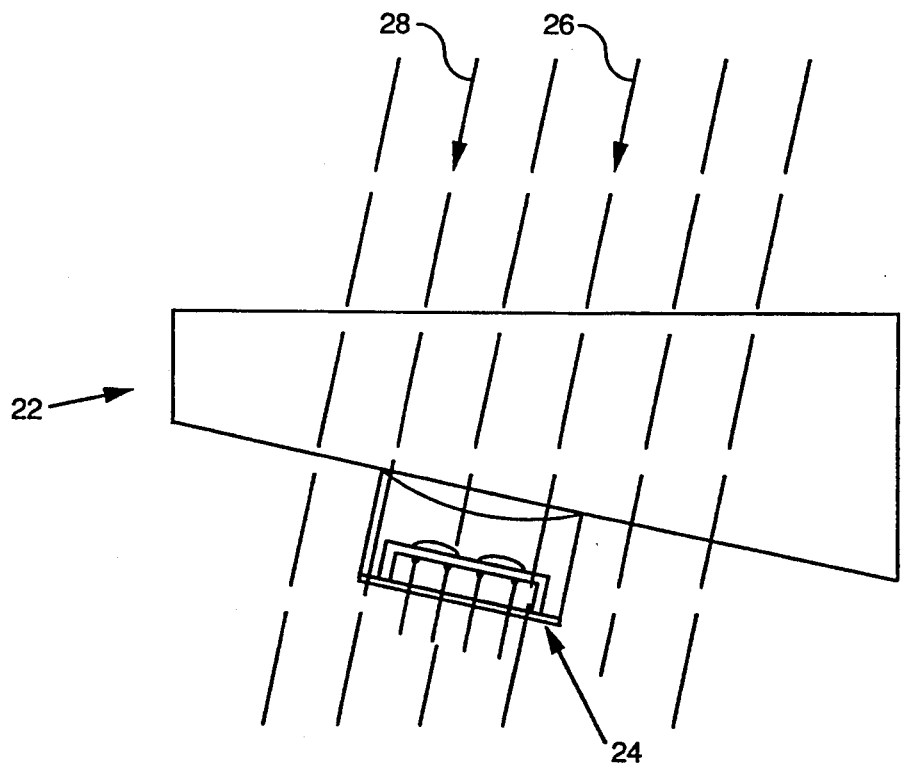
FIG. 2 is a schematic elevation view of a prior art RLG output prism.

The present invention relates to improved detectors including photodetectors mounted on an RLG output prism. Thus prism 22 has a relatively large crystalline silicon detector 24 mounted thereon, as shown in FIG. 2. Such crystalline detector is relatively large, as it sits in the path of oncoming high energy radiation pulse waves, indicated by arrows 26 and 28 in such FIG. 2.

Figure 3:
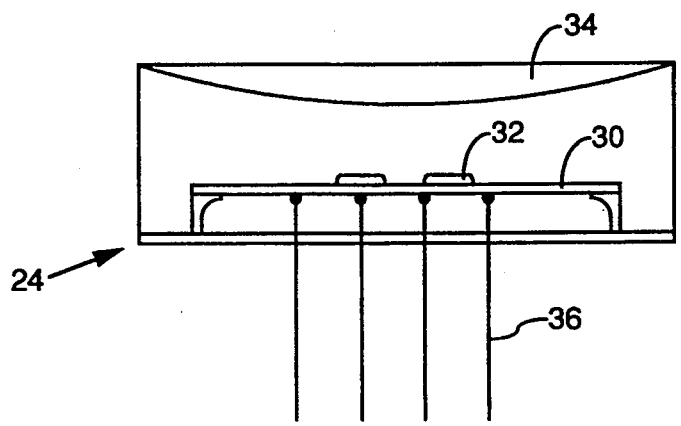
FIG. 3 is an enlarged fragmentary schematic elevation view of a component of the prior art output prism shown in FIG. 2.

In addition to presenting a relatively large target for the above pulse waves, the prior art detector 24, per the enlarged view of FIG. 3, includes a crystalline silicon chip 30, surmounted by crystalline silicon detectors 32, spaced from a focusing lens 34, per FIG. 3. As shown in such figure, electric signal-carrying wires 36 run from the silicon chip 30 to transmit navigational or other data to a data processing system.

As noted above, such prior art detector suffers from the above described "prompt effect" and whites out or becomes charge-saturated, when its relatively large area is struck by high energy radiation, as discussed above. Further, the crystalline silicon components 32 and 30 of such detector, suffer the "delayed effect" of such high energy radiation, including a photo-darkening effect, that can mean permanent defects in such photo detector and distortion or degradation of the output data therefrom, as also discussed above.

Figure 4:
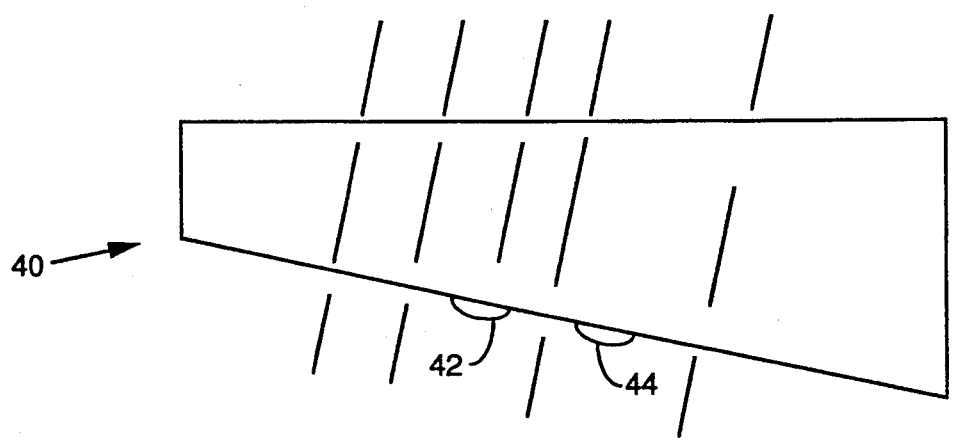
FIG. 4 is a schematic elevation view of an RLG output prism according to the present invention.

The present invention provides, e.g. an output prism 40, photodiodes 42 and 44, per FIG. 4, of greatly reduced size over those of the prior art, e.g. photodiode 24, shown in FIG. 2 hereof.

In addition to size reduction, the make-up of such photodiodes considerably differs from hose of the prior art. That is, rather than being formed of a crystalline silicon, the RLG detectors of the present invention are formed of amorphous material, such as hydrogenated amorphous silicon (a-Si:H), which are considerably more durable than their crystalline counterparts when subjected to high energy radiation. That is, a-Si:H will achieve "defect saturation" wherein few defects are created in the material due to continued radiation thereof.

Figure 5:
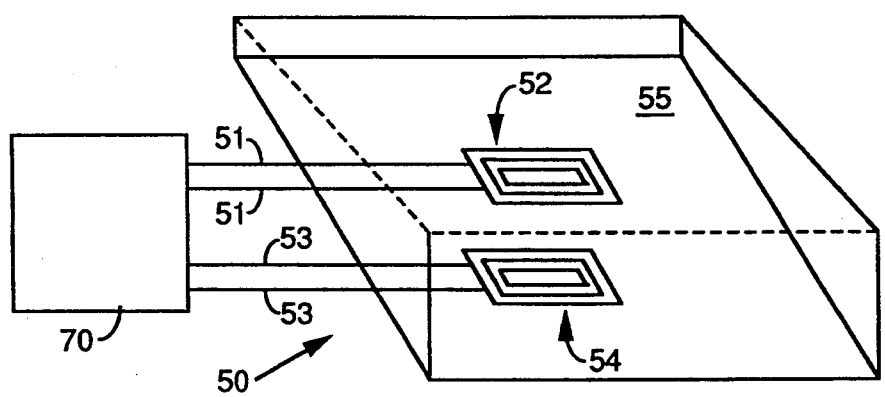
FIG. 5 is a perspective view of an RLG output prism and other components embodying the present invention.

FIG. 5 illustrates the layout of a preferred embodiment of the invention wherein an output prism 50 has mounted thereon hydrogenated amorphous silicon (A-Si:H) PIN diodes 52 and 54, which were deposited on the prism face 55 by plasma-enhanced chemical vapor deposition (PECVD).

Also in FIG. 5, photolithographic leads 51 and 53 connect the above diodes to fringe counting circuit 70 for, e.g. vehicle attitude or rotation calculations.

Figure 6:
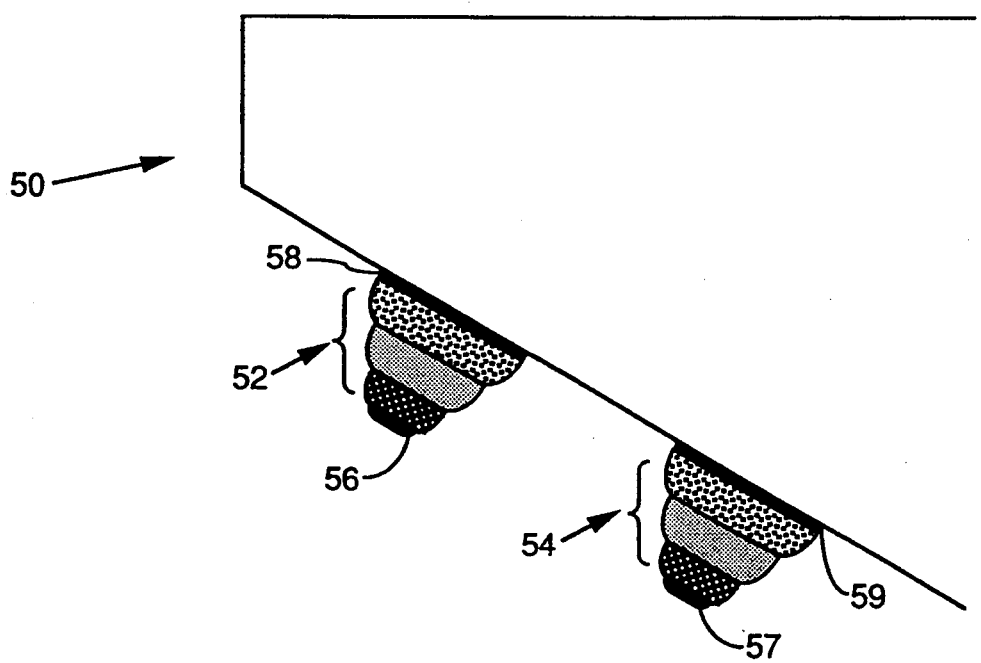
FIG. 6 is an enlarged fragmentary schematic elevation view of components of the RLG output prism of the invention shown in FIG. 5

To further show their physical layout, such PIN diodes 52 and 54 are deposited on heterodyning prism 50, as shown in schematic elevation view in FIG. 6. PIN diode 52 is positioned between metal (e.g. palladium) contacts 56 and 58, while PIN diode 54 is positioned between metal contacts 57 and 59, as shown in FIG. 6.

PIN diodes are known in the art(for other applications) and need not be further disclosed here. Such diodes are preferably applied to the output prism by vapor deposition e.g., (PECVD) through a series of masks to obtain, e.g. the layer build-up, as shown in FIG. 6 hereof. While PECVD is preferred, one may also employ other methods of mounting the diodes on the RLG output prism per the invention, including thermal CVD and ion implant (or by growing thereon) of such diodes. Such diodes can also be pre-formed and subsequently mounted on such output prism per the invention, although this method increases the size of these diodes and thus is less desireable.

Accordingly, the output prism amorphous photodiodes of the present invention are considerably reduced in size, (e.g. 0.5 to 1.0 m) (m=microns) compared with the larger crystalline diodes of the prior art, (e.g. 2.0 to 20 m), so that the former present a greatly reduced target (v. the latter) for high energy pulse shockwaves and considerably minimize the "prompt and delayed effects" suffered by the above prior art diodes.

Figure 7:
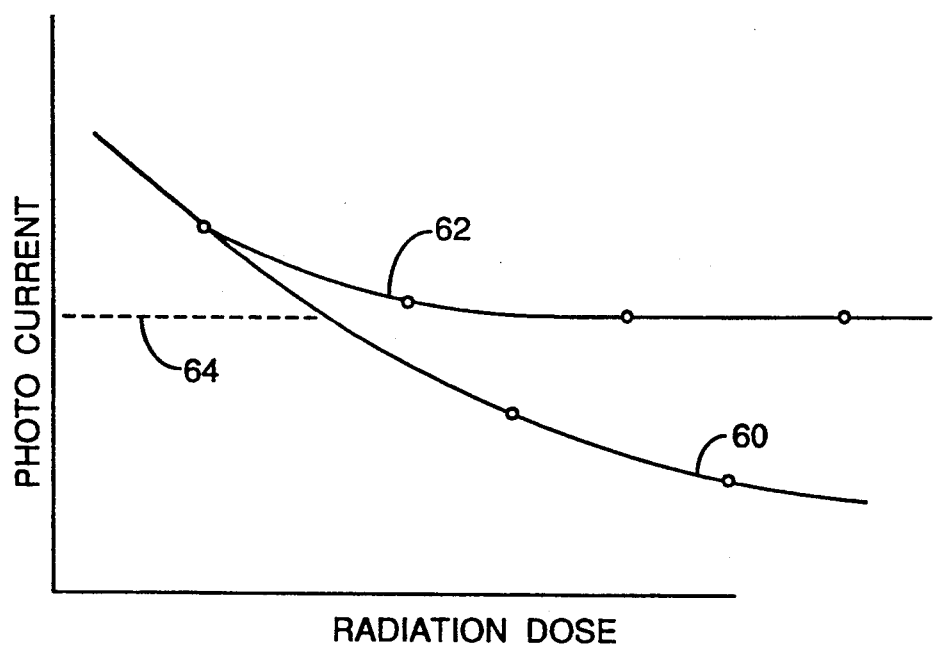
FIG. 7 is a graph relative to RLG output prisms of the present invention.

As to the "delayed effect," the RLG output prism diodes of the present invention again fare well compared with the diodes of the prior art. Thus, as shown in FIG. 7, photocurrent (in ma) is plotted against radiation dose (in Megarads) and curve 60 represents the performance of prior art crystalline diodes, while curve 62 represents the performance of amorphous photodiodes per the present invention, as to the "long term" performance of each type of diode after each has been exposed to a pulse of high energy radiation and after such pulse has passed, in terms of hours, days or weeks; that is, the relatively permanent after effects of photodarkening visited upon each such type of photodiode. As shown in FIG. 7, the curve 60 of the prior art, crystalline photodiode continues on a downward path, relative to photo current and thus data delivery and/or degradation of the so-transmitted data to, e.g. a navigation or course-correction system. In contrast, the amorphous photodiode of the present invention, per curve 62, after an initial decline in photocurrent, levels off at saturation line 64, as shown in FIG. 7, showing that the damage in transmission of data is limited even at increasing radiation dosage.

This means that the amorphous detectors, including photodiodes of the present invention, can be pre-irradiated to a point that the sensitivity thereof to radiation-induced photo darkening is saturated so that increases in radiation fluence or dosage, will cause no further degradation of photocurrent passing therethrough and thus detector performance can be maintained with increasing radiation fluence proximate the saturation line 64 of FIG. 7.

Thus the present invention provides for pre-irradiating the amorphous detectors of the present invention including e.g. amorphous hydrogenated silicon photodiodes, so as to operate at a radiation dosage saturation level and then the RLG, including its output prism, can be designed to operate at such levels. Then when a high energy radiation event occurs, resulting in a high fluence of charged particles, they will have considerably less effect on the amorphous detectors of the present invention than on the sensitive and comparatively fragile detectors of the prior art.

That is, one can pre-irradiate the photodetectors and make such amorphous material even less sensitive to increased irradiation so that the output current therefrom will remain relatively constant and provide accurate data, including for navigation, during the high energy event and afterward.

The amorphous detector of the present invention including photodiodes, are, as noted above, preferably of hydrogenerated amorphous silicon (a-Si:H) PIN diodes. However, such amorphous detectors can also be of other semi-conductor diode structures, as previously stated, including that of hydrogenerated amorphous germanium (a-Ge:H) and a combination of hydrogenerated amorphous silicon and germanium (a-Ge$_x$Si$_{1-x}$:H, where x is between 0 and 1). As noted above, such detectors can be positioned or mounted on the output prism by vapor deposition and other procedures including thermal CVD and ion implant.

In connection with RLG systems, the amorphous detectors of the present invention provide several advantages over the current hardening methods of crystalline detectors. Thus, the detectors of the present invention's lower sensitivity to radiation will improve the guidance and control systems for current military systems in which RLGs are used or intended, as well as for other systems, e.g. weather satellites.

Thus the integration of the optics and electronics of the RLG system results in a reduction of the volume of the device and its associated electronics. This feature, when combined with the radiation resistance of the amorphous stochiometry and PECVD producability, yield a superior RLG output device. Another feature of the invention is that it represents an advancement of the state of the art in RLG technology by utilizing existing semiconductor technology to grow smaller PIN diode structures directly onto the RLG output device, making possible lower-per-unit costs. This directly affects the availability and reliability of systems utilizing the invention, which thus increases mission effectiveness. The examples of such systems are SDI pointing and positioning systems, nuclear weapon guidance and control systems and conventional SAC, TAC and MAC aircraft operating in a nuclear theater as well as comercial aircraft and marine vessels.

Other possible applications of the device include a survivable RLG for orbiting space-born systems in long-term, high-accuracy applications. The natural space environment being a virtual sea of high energy particles, requires the use of a radiation-hardened, survivable, electro-optical sensor. Space experiments, such as an orbiting RLG to test Parameterized Post-Newtonian theories of gravitation or communication satellite attitude control systems, as well as the above-noted air and marine vehicles, represent civilian applications of the present invention.

The light-induced degradation affect in (a-Si:H) material associated with the Staebler-Wronski effect, has been shown to of a benign nature in high energy environments. For very intense radiation fields, enhanced hardness of the invention is accomplished by shielding the diodes of the invention with radiation resistant materials.

Also in addition to the above discussed RLG applications, one can employ amorphous detectors, (including thin amorphous PIN diode structures) for:

1) particle detectors for high energy particle accelerators such as the newly proposed Super Conducting,Super Collider (S$^2$C) or the Stanford Linear Accelerator (SLAC) or the European Accelerator (CERN).

2) Detector arrays for military surveillance systems.

Preferably the PIN diodes of the invention are vapor deposited onto an output prism rather than glued on, as glue can degrade in a nuclear environment and the diodes can loosen or fall off such prism impairing the RLG operation.

What is claimed is:

1. An integrated optical RLG photodetector that is radiation resistant comprising, amorphous PIN semiconductor diodes mounted directly to the face of an RLG heterodyning prism, said diodes having been pre-irradiated for increased durability and continued operation during high energy radiation events and afterward with reduced signal degradation.

2. The photodetector of claim 1 wherein said diodes are selected from the group consisting of a-Si:H, a-Ge:H, and a-Ge$_x$Si$_{l-x}$:H., where x is between 0 and 1.

3. The photodetector of claim 1 wherein said amorphous diodes are deposited on said prism face.

4. The photodetector of claim 1 wherein said diodes are PECVD hydrogenated amorphous silicon PIN diodes deposited onto the face of a heterodyning prism.

5. The photodetector of claim 1 wherein the cross-sectional area of said detectors is 0.1 to 20.0 m wide by 0.1 to 20.0 m long.

6. The photodetector of claim 1 wherein said diodes are vapor deposited onto the face of an RLG heterodyning prism.

* * * * *